United States Patent
Zhang et al.

(10) Patent No.: US 9,932,856 B2
(45) Date of Patent: Apr. 3, 2018

(54) COOLING APPARATUS FOR TURBOMACHINERY WITH METHOD OF INSTALLATION

(71) Applicant: General Electric Company, Schenectady, NY (US)

(72) Inventors: Hua Zhang, Greer, SC (US); Douglas Scott Byrd, Greer, SC (US); David Terry Trayhan, Jr., Greenville, SC (US)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 14/550,946

(22) Filed: Nov. 22, 2014

(65) Prior Publication Data

US 2016/0146043 A1    May 26, 2016

(51) Int. Cl.

| | |
|---|---|
| *F01D 25/12* | (2006.01) |
| *F01D 1/18* | (2006.01) |
| *F02C 7/143* | (2006.01) |
| *F02C 3/30* | (2006.01) |
| *F02C 6/06* | (2006.01) |
| *F02C 6/10* | (2006.01) |
| *F02C 7/18* | (2006.01) |

(52) U.S. Cl.
CPC .............. *F01D 25/12* (2013.01); *F01D 1/18* (2013.01); *F02C 3/30* (2013.01); *F02C 3/305* (2013.01); *F02C 6/06* (2013.01); *F02C 6/10* (2013.01); *F02C 7/1435* (2013.01); *F02C 7/185* (2013.01); *F05D 2260/212* (2013.01); *F05D 2270/16* (2013.01)

(58) Field of Classification Search
None
See application file for complete search history.

(56) References Cited

U.S. PATENT DOCUMENTS

| | | | |
|---|---|---|---|
| 3,238,719 A | 3/1966 | Harslem | |
| 5,782,080 A * | 7/1998 | Illbruck | .................. F02C 7/185 |
| | | | 261/159 |
| 6,453,659 B1 * | 9/2002 | Van Liere | .......... F02M 25/0225 |
| | | | 123/541 |
| RE38,831 E * | 10/2005 | Horii | ..................... F02C 7/1435 |
| | | | 60/39.3 |
| 2004/0135006 A1* | 7/2004 | Zur | ........................... B05B 1/14 |
| | | | 239/490 |
| 2008/0216461 A1* | 9/2008 | Nakano | ..................... F02C 3/30 |
| | | | 60/39.53 |
| 2015/0377133 A1* | 12/2015 | Kanebako | ............... F04B 1/324 |
| | | | 60/39.54 |

FOREIGN PATENT DOCUMENTS

| | | | | |
|---|---|---|---|---|
| EP | 1365127 A2 * | 11/2003 | ............. | F02C 3/305 |
| EP | 2418367 A1 * | 2/2012 | ............. | F01D 5/187 |

* cited by examiner

*Primary Examiner* — Pascal M Bui Pho
*Assistant Examiner* — Kyle Thomas
(74) *Attorney, Agent, or Firm* — Ernest G. Cusick; Hoffman Warnick LLC

(57) ABSTRACT

Embodiments of the present disclosure provide cooling systems for turbomachinery and methods of installation. In an embodiment, an apparatus of the present disclosure can include a ventilation conduit for routing a cooling air from a compressor of a power generation system to a turbine component of the power generation system; and a nozzle in fluid communication with the ventilation conduit, wherein the nozzle delivers water from a water supply into the ventilation conduit.

17 Claims, 6 Drawing Sheets

COOLING APPARATUS FOR TURBOMACHINERY WITH METHOD OF INSTALLATION

BACKGROUND OF THE INVENTION

The disclosure relates generally to cooling apparatuses for power generation systems and methods for installing the same. More specifically, the disclosure relates to turbomachines with cooling apparatuses therein, and methods for installing cooling apparatuses within conventional turbomachines.

Conventional turbine systems are frequently used to generate power for, e.g., electric generators. A working fluid such as hot gas or steam can be forced across sets of turbine blades coupled to a rotor of the turbine system. The force of the working fluid on the blades causes those blades (and the coupled body of the rotor) to rotate. In many cases, the rotor body is coupled to the drive shaft of a dynamoelectric machine such as an electric generator. In this sense, initiating rotation of the turbine system rotor can also rotate the drive shaft in the electric generator to generate an electrical current (associated with a power output).

Variables such as the turbine's efficiency, power output, and risk of failure are at least partially dependent on the internal temperature of particular components and passages, such as inlets, outlets, etc. The temperature of a working fluid flowing through the turbine system will affect outputs, such as the rotation torque and/or power generated. Designing a turbine system to have a particular operating temperature can improve these outputs. The process of controlling operating temperatures to increase the power output of a system can be known as "turbine power augmentation." To manage the temperature of a turbine system, various cooling systems may be deployed.

The health and performance of a turbomachine can be at least partially dependent on the amount of cooling required, and the means by which coolants are provided to various components of the turbomachine. In conventional systems, cooling air can be diverted from a compressor component of the turbomachine to cool other components, and this diverted air may be known as bleed air and/or compressor bleed air. Reducing and/or minimizing the amount of bleed air taken from the compressor of a turbomachine can enhance a turbomachine's operational performance and efficiency, in addition to providing several other technical benefits not specifically discussed.

BRIEF DESCRIPTION OF THE INVENTION

Cooling systems for turbomachinery and corresponding methods of installation are discussed. Although embodiments of the disclosure are discussed by example herein relative to turbine applications, it is understood that embodiments of the present disclosure may be applied to other situations, e.g., any machine with one or more components conventionally cooled with limited and/or multipurpose sources of cooling air.

A first aspect of the invention provides an apparatus including: a ventilation conduit for routing a cooling air from a compressor of a power generation system to a turbine component of the power generation system; and a nozzle in fluid communication with the ventilation conduit, wherein the nozzle delivers water from a water supply into the ventilation conduit.

A second aspect of the invention provides a turbomachine including: a compressor; a turbine component in fluid communication with the compressor through a combustor; a ventilation conduit in fluid communication with the compressor and the turbine component, wherein the ventilation conduit routes a cooling air from the compressor to the turbine component, and further includes a nozzle for delivering water from a water supply into the cooling air.

A third aspect of the invention provides an apparatus including: a valve positioned between a water supply to a wet compression injector system and a nozzle in fluid communication with a ventilation conduit for routing a cooling air from a compressor of a power generation system to a turbine component of the power generation system; a sensor for measuring a temperature in the power generation system; and a controller operatively connected to the valve, wherein the controller adjusts a position of the valve based on a difference between the temperature and a cooling requirement of the power generation system.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
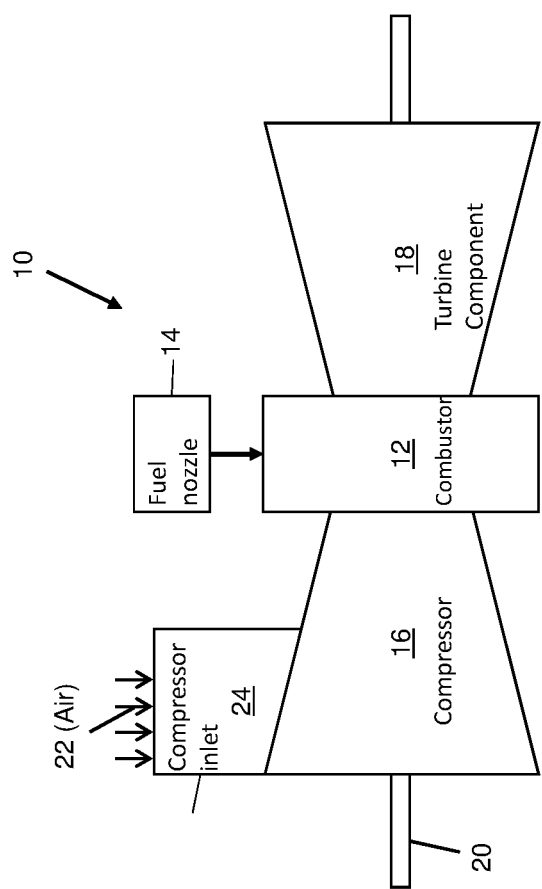
FIG. 1 is a schematic view of a conventional power generation system in the form of a gas turbine.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As discussed herein, aspects of the invention relate generally to cooling systems for turbomachinery and corresponding methods of installation. More particularly, as discussed herein, aspects of the invention relate to cooling systems for turobmachinery which operate via the principle of evaporative cooling. Aspects of the present disclosure also include processes for installing cooling systems which operate using evaporative cooling.

Referring to FIG. 1, a conventional power generation system 10 in the form of a turbomachine is shown. Embodiments of the present disclosure can be adapted for use with power generation system 10 and/or can be integrated into components thereof. Power generation system 10 is shown by example as being a combustion-based turbomachine assembly, though embodiments of the present disclosure can also be adapted for use with other types of turbomachines where applicable. In combustion-based turbomachines, a combustor 12 including a plurality of fuel nozzles 14 is typically located between a compressor 16 and a turbine component 18 of power generation system 10. Compressor 16 and turbine component 18 can be mechanically coupled to each other through a rotatable shaft 20.

Air 22 flows sequentially through compressor 16, combustor 12, and turbine component 18. The compression provided from compressor 16 can also increase the temperature of air 22. Fuel nozzle(s) 14 can provide fuel to combustor 12, where the fuel combusts in the presence of air 22 to yield a hot gas stream. The hot gas stream from combustor 12 can enter turbine component 18 to impart mechanical energy to rotatable shaft 20, e.g., by rotating a group of turbine buckets, thereby delivering power back to compressor 16 and/or any loads (not shown) mechanically coupled to rotatable shaft 20. Power generation system 10 may include a compressor inlet 24 preceding compressor 16, though which air can be provided to compressor 16 before being compressed and delivered to combustor 12. Although not shown specifically in FIG. 1, power generation system 10 can include multiple stages with respective combustors 12, compressors 16, and/or turbines 18. Power generation system 10 may in addition be one of several individual turbomachines controlled via the same operator and/or may be part of a larger power generation system.

Figure 2:
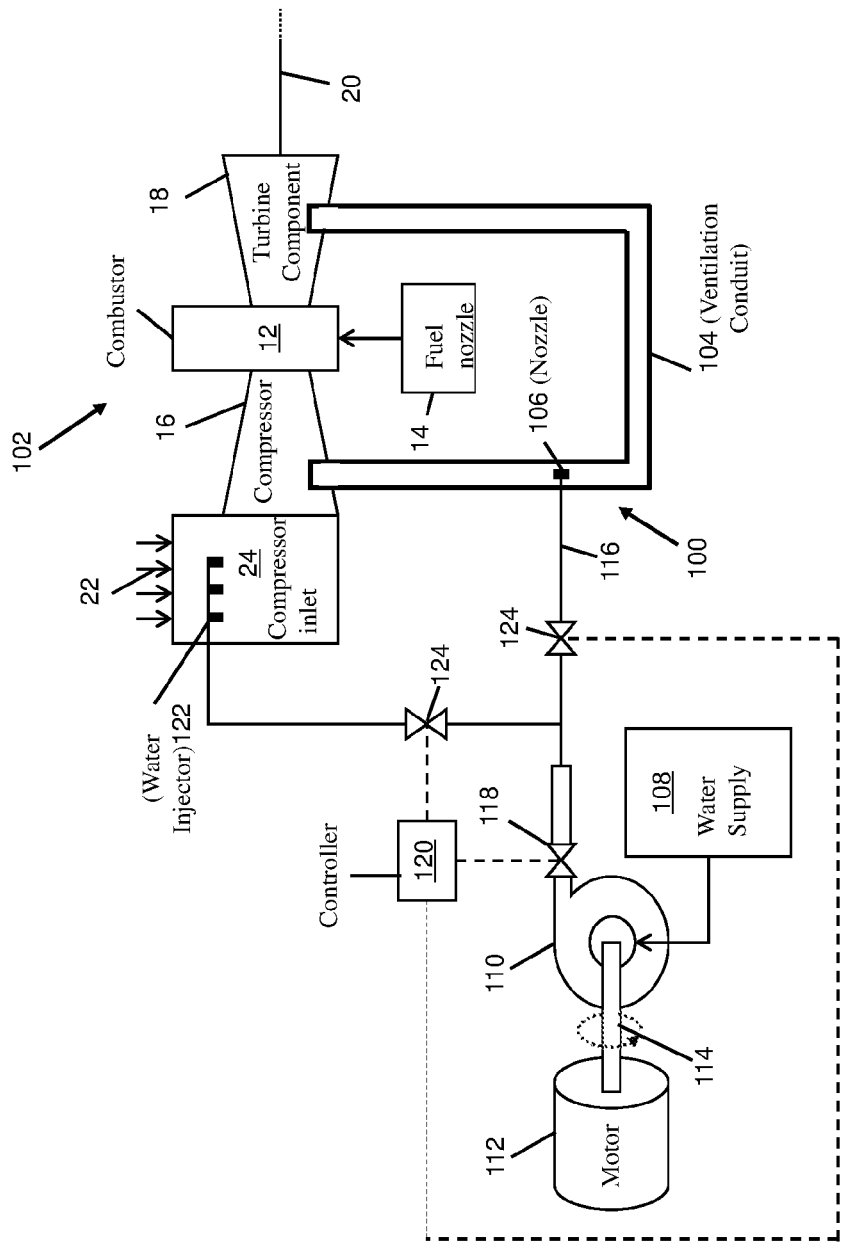
FIGS. 2-3 each provide a schematic view of an apparatus and turbomachine according to embodiments of the present disclosure.

Turning to FIG. 2, an apparatus 100 forming part of and/or used with a turbomachine 102 is shown. Apparatus 100 can include a ventilation conduit 104 for routing a cooling air from compressor 16 to turbine component 18. In an example embodiment, ventilation conduit 104 can route a bleed air from compressor 16 to turbine component 18 to further cool turbine component 18 and structural features included therein. A nozzle 106 can extend through ventilation conduit 104 or otherwise be positioned therein. Nozzle 106 can deliver water from a water supply 108 to ventilation conduit 104. In embodiments of the present disclosure, water provided to ventilation conduit 104 from nozzle 106 can function as an evaporative coolant, and can cool components of turbomachine 102 by evaporative cooling. Evaporative cooling refers to a process in which a coolant material with a high heat of vaporization (e.g., water, with a heat of vaporization of 40.68 kilojoules per mole) cools a flowing fluid, such as air. As non-limiting alternatives, embodiments of the present disclosure can also use other evaporative coolants, whether currently known or later developed, with similar heat transfer properties. In evaporative cooling, a fluid can transfer energy to the coolant to evaporate the coolant, thereby reducing the temperature of the fluid.

In an embodiment, nozzle 106 can be in the form of a pressure atomizing nozzle for spraying water into or onto a particular component or region. As an example, nozzle 106 in the form of a pressure-atomizing nozzle can include a flow chamber for withstanding pressures of at least approximately 6.89 megapascals (MPa) and at most approximately 20.7 MPa, which can be separated from ventilation conduit 104 by a plurality of apertures. The plurality of apertures may be dimensioned to atomize water entering ventilation conduit 104 through nozzle 106. In a specific example, the apertures of nozzle 106 can be between approximately five micrometers ($\mu$m) and approximately forty $\mu$m in diameter, or more specifically between approximately thirty and approximately forty in diameter. As alternatives to an atomizing nozzle, nozzle 106 can be in the form of one or more jet nozzles, convergent or divergent nozzles, propelling nozzles, spray nozzles, shaping nozzles, micro-laminated nozzles, or any other type of nozzle whether currently known or later developed. As used herein, the term "approximately" in relation to a specified numerical value (including percentages of base numerical values) can include all values within ten percentage points of (i.e., above or below) the specified numerical value or percentage, and/or all other values which cause no operational difference or substantial operational difference between the modified value and the enumerated value. The term approximately can also include other specific values or ranges where specified herein.

Water from water supply 108 can be provided to nozzle 106 by any currently known or later developed system for transferring water from a supply (e.g., a tank, reservoir, etc.) to a particular component. In the example shown in FIG. 2, a pump 110 can be in fluid communication with water supply 108. Pump 110 can be powered by, e.g., a motor 112 such as an electric motor, a gasoline motor, etc., mechanically coupled to pump 110 through a rotatable shaft 114. Water can enter nozzle 106 by way of a water pipe 116. A control valve 118 positioned between pump 110 and nozzle 106 can separate water pipe 116 and nozzle 106 from pump 110. Control valve 118 can be in the form of any currently known or later developed valve component, including without limitation, a hydraulic valve, a ball valve, a disc valve, a globe valve, etc. Control valve 118 can be manually actuated or electrically actuated. Control valve 118 can control an amount of water delivered from water supply 108 to nozzle 106, and can be manually or automatically operated. As examples, control valve 118 can be manually operated by a user or another machine or piece of equipment operatively connected to control valve 118.

In a specific embodiment, control valve 118 can be adjusted (i.e., at least partially opened or closed) by way of a controller 120 operatively connected thereto. Controller 120 can generally include any type of computing device capable of performing operations by way of a processing component (e.g., a microprocessor) and as examples can include one or more computers, computer processors, electric and/or digital circuits, and/or similar components used for computing and processing electrical inputs. Various sub-components and operational characteristics of controller 120 are discussed in further detail elsewhere herein. Controller 120 can adjust a position of control valve 118 based on one or more factors related to the performance of turbomachine 102. Controller 120 can adjust the position of control valve 118 in response to a particular operating condition of turbomachine 102. As used herein, an operating condition generally refers to one or more variables related to the operation and/or performance of turbomachine 102, and as examples can include temperatures of one or more individual components, emissions, efficiencies, fuel compositions, fuel consumption rates, fluid flows, an amount of air drawn from compressor 16, etc., which may be measured with one or more sensors (not shown) in communication with controller 120. In an embodiment, controller 120 can open control valve 118 in response to a temperature of turbine component 18 being above a predetermined threshold, which may be defined by a user input to controller 120 and/or software therein. Alternatively, controller 120 can adjust the position of control valve 118 based on predetermined cooling requirements for turbomachine 102. For instance, controller 120 may include a predetermined fluid flow rate and/or amount of water to be provided to ventilation conduit 104 for cooling turbine component 18 by a particular temperature differential (measured, e.g., in Kelvins or Celsius degrees).

Apparatus 100 and/or turbomachine 102 can also include a wet compression injector system 122 in fluid communication with water supply 108 and compressor 16. Wet compression injector system 122 may be an existing or separately installed cooling apparatus for providing water and/or other coolants to compressor inlet 24, thereby reducing the temperature of air 22 before it enters compressor 16. Wet compression injector system 122 can inject water to compressor inlet 24 via multiple apertures for atomizing water from water supply 108. Wet compression injector system 122, by design, may include and/or be operatively connected to water supply 108 to store coolants for reducing the temperature of air 22. Water entering wet compression injector system from water supply 108 can cool air 22 by evaporative cooling and/or increase the moisture content of air 22.

Valves 124 can separate control valve 118 from nozzle 106 and wet compression injector system 122. Control valve 118 can govern a total amount of water pumped from water supply 108, and valves 122 can govern relative amounts of water provided to nozzle 106 and/or wet compression injector system 122. Controller 120 can be operatively connected to valves 124 in addition or alternatively to control valve 118, and can adjust valves 124 based on the operating conditions of turbomachine 102 and/or any cooling requirements for turbomachine 102. With valves 124, apparatus 100 can divert a portion of water from wet compression injector system 122 into nozzle 106 and ventilation conduit 104 to cool air and other fluids therein. Controller 120 can increase or decrease the amount of water diverted through valves 124 to nozzle 106 based on e.g., a correlation with the amount of water directed to wet compression injector system 122.

Figure 3:
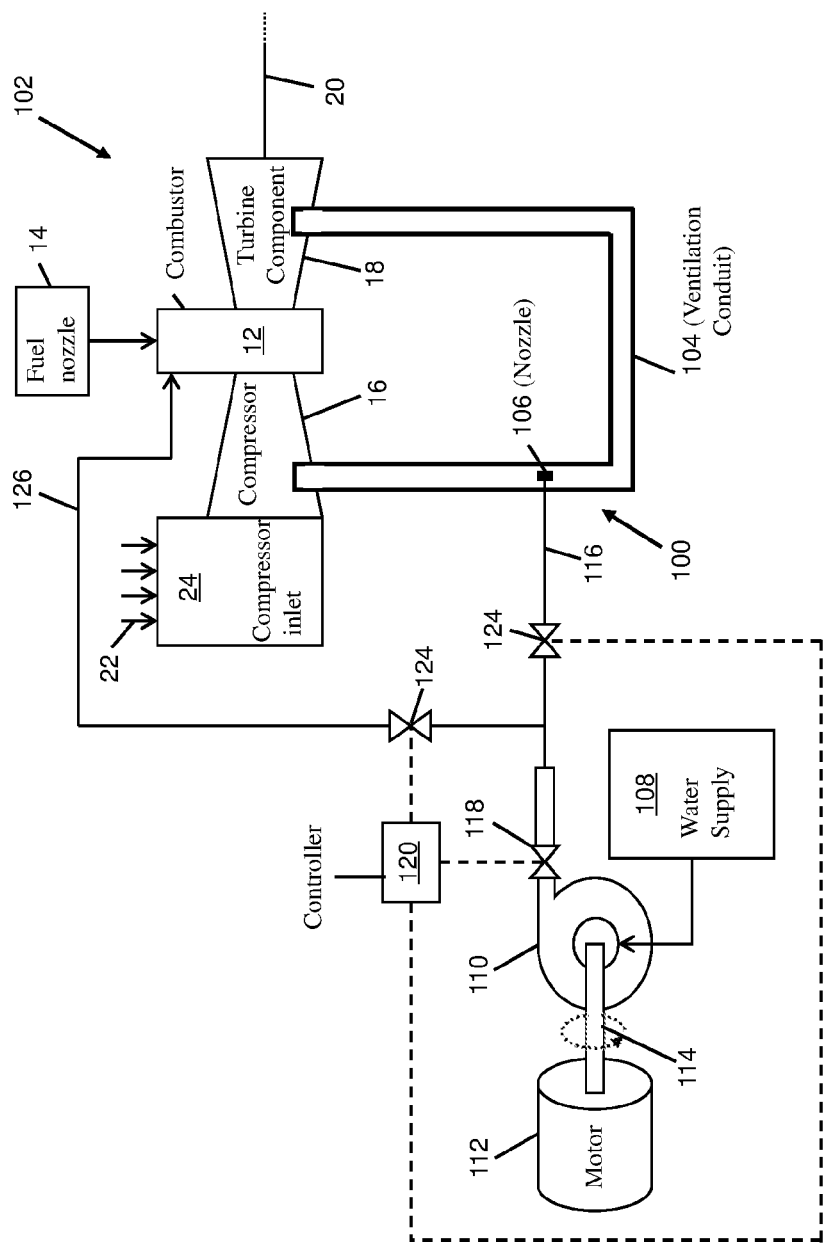

Turning to FIG. 3, an alternative embodiment of apparatus 100 and turbomachine 102 is shown. In some power generation systems, a water injector system 126 may be present as an addition or alternative to wet compression injector system 122 (FIG. 2). Water injector system 126 may be in fluid communication with water supply 108 and combustor 12, and more specifically can be coupled to a portion of combustor 12 where fuel is injected from fuel nozzle(s) 14. Water injector system 126 can provide additional moisture and/or cooling to fuel entering combustor 12 from fuel nozzle(s) 14, and can provide cooling and/or moisture to a reaction chamber positioned within combustor 12. Water injector system 126 can include water supply 108 therein or can otherwise be connected to (i.e., in fluid communication with) water supply 108. Valves 124 can be positioned between control valve 118 and water pipe 116 to control relative amounts of water provided to nozzle 106 and water injector system 126. Valves 124 can be operatively connected to controller 120, such that valves 124 and control valve 118 can be adjusted (i.e., opened or closed) to provide differing amounts of water to apparatus 100, water injector system 126, and/or other components or systems used with turbomachine 102. Wet compression injector system 122 and water injector system 126 are shown separately in FIGS. 2 and 3 for clarity. It is understood that wet compression injector system 122 and water injector system 126 may be used together where desired and/or applicable, and that the same water supply 108 or separate water supplies 108 may be connected to different systems discussed herein.

Figure 4:
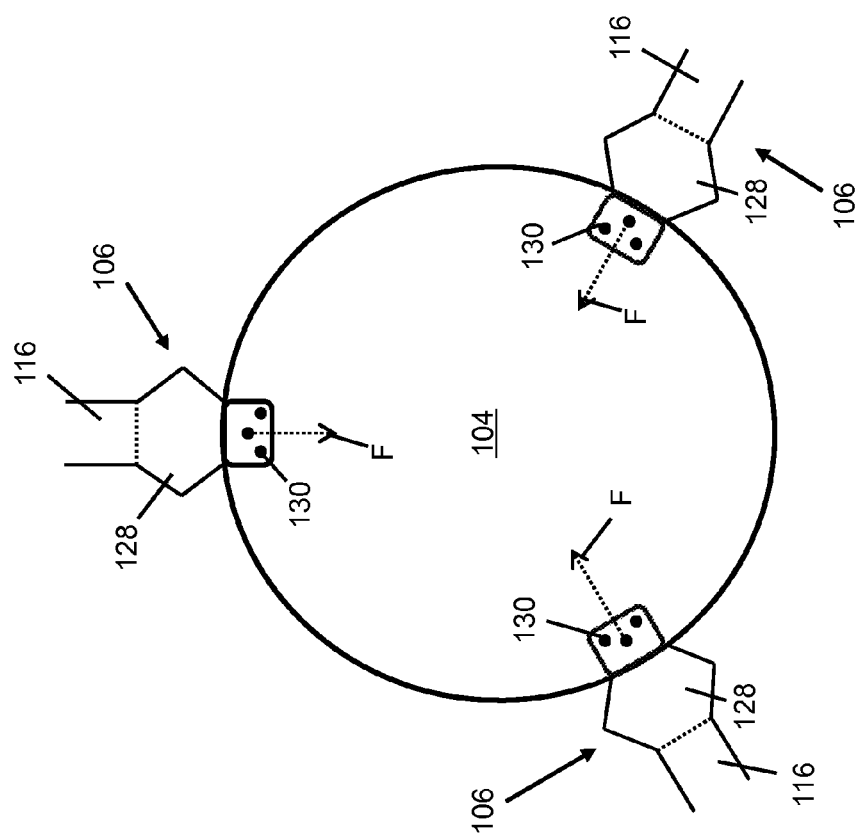
FIG. 4 provides a cross-sectional view of a ventilation conduit and nozzles according to embodiments of the present disclosure.
Figure 5:
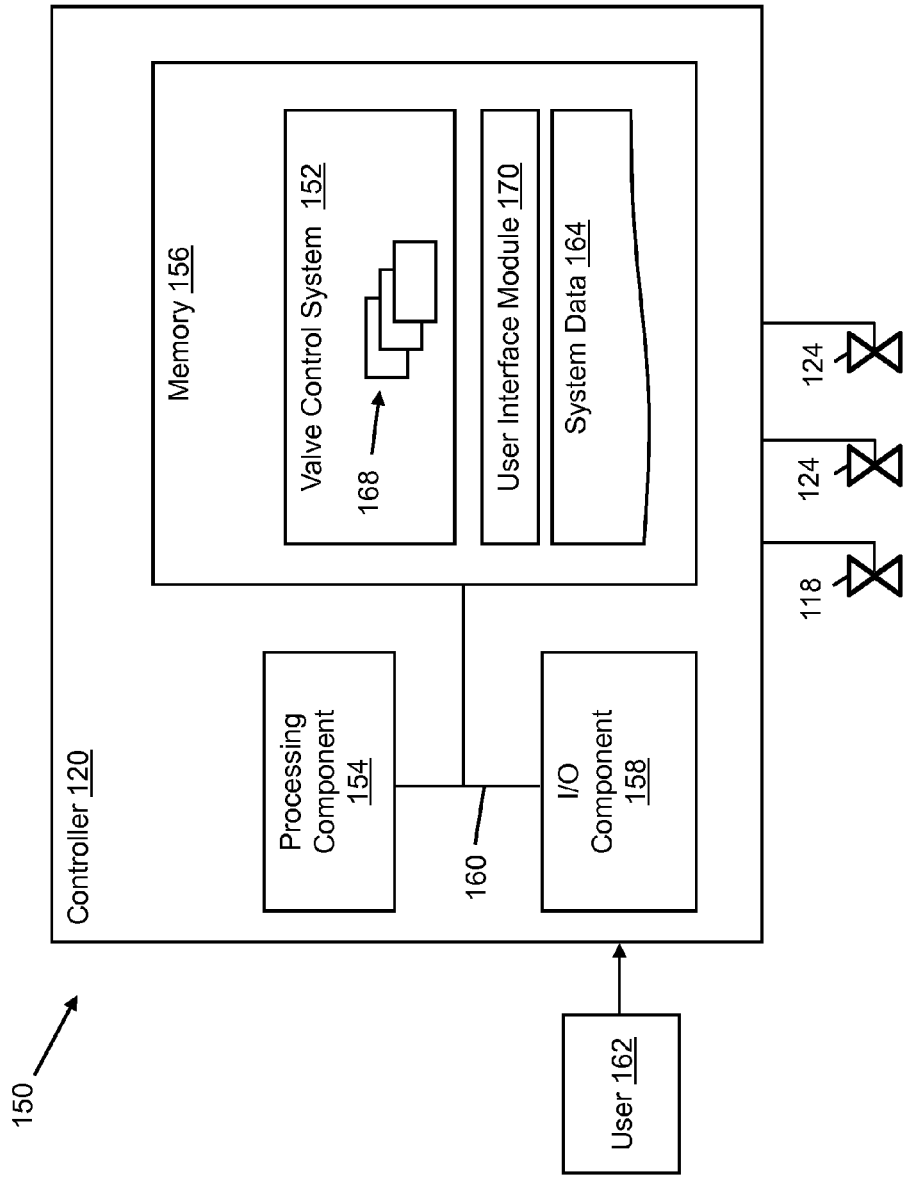
FIG. 5 depicts an illustrative environment which includes a controller interacting with several valves according to embodiments of the present disclosure.

Turning to FIG. 4, a cross-sectional view of ventilation conduit 104 is shown. In an embodiment, nozzle 106 can be in the form of multiple nozzles 106 coupled to outlets from the same water pipe 116, a group of connected water pipes 116, and/or independent water pipes 116. To further distribute water as an evaporative coolant throughout ventilation pipe 104, nozzles 106 can include a swirling chamber 128 in fluid communication with ventilation conduit 104 through a plurality of apertures 130 in each nozzle 106 to generate smaller water droplets, which can enhance the effectiveness of cooling. Swirling chamber 128 can have a different volume and/or geometry from a cross section of water pipe 116. In an embodiment, swirling chamber 128 can include features such as protrusions extending from the walls of swirling chamber 128 and/or dimples embedded in the surface thereof to further disrupt the flow of water provided from water pipe 116, such as by creating a turbulent flow, and increasing the amount of swirling, mixing, etc., therein. Plurality of apertures 130 can be dimensioned to atomize the injected water into particles with particular dimensions. As is discussed elsewhere herein, apertures 130 can have a diameter between approximately five μm and approximately forty μm, and more specifically can have a diameter between approximately thirty μm and approximately forty μm. A net flow of water from apertures 130 can travel substantially along a direction of fluid flow F denoted by phantom arrows extending from nozzles 106 in FIG. 4. Swirling chamber 128 and apertures 130 can have different sizes, shapes, etc., in various embodiments to provide different fluid flow characteristics for water droplets entering ventilation conduit 104 from nozzles 106.

FIG. 5 depicts an illustrative environment 150 for controlling one or more control valve(s) 118 and/or valve(s) 124 (collectively "valve(s) 118, 124") according to embodiments. To this extent, environment 150 includes controller 120 for performing processes and imparting electrical commands to control valve(s) 118, 124 and associated systems and tools. Although valve(s) 118, 124 are shown by example in FIG. 5, it is understood that environment 100 with controller 120 can be used with only one or multiple embodiments of the present disclosure discussed herein, including without limitation turbomachines 102 (FIGS. 2, 3) with wet compression injector system 122 (FIG. 2) and/or water injector system 126 (FIG. 3) therein. Controller 120 is shown as including a valve control system 152, which makes controller 120 operable to adjust valve(s) 118, 124 and/or associated systems and tools described herein for implementing any/all of the embodiments described herein. In operation, valve control system 152 can issue electrical commands, which in turn may be converted into mechanical actions (e.g., an action of opening or closing one or more valves 118, 124) in response to particular conditions. The conditions for opening and/or closing or any other type of regulation of valves 118, 124 can include, e.g., a temperature of compressor inlet 24 (FIGS. 1-3) exceeding a threshold value, a temperature of combustor 12 (FIGS. 1-3) and/or turbine component 18 (FIGS. 1-3) being within or outside a range of threshold values, the flow rate to water injection system 122, or other operating variables and/or measurements pertaining to turbomachine being within or outside a particular range of threshold values.

Controller 120 is shown including a processing component 154 (e.g., one or more processors), a memory 156 (e.g., a storage hierarchy), an input/output (I/O) component 158 (e.g., one or more I/O interfaces and/or devices), and a communications pathway 160. In an embodiment, processing component 154 may execute program code, such as valve control system 152, which is at least partially fixed in memory 156. While executing program code, processing component 154 can process data, which can result in reading and/or writing transformed data from/to memory 156 and/or I/O component 158 for further processing. Pathway 160 provides a communications link between each of the components in controller 120. I/O component 158 can comprise one or more human I/O devices, which enable a human or system user 164 to interact with the controller 120 and/or one or more communications devices to enable user(s) 162 to communicate with the controller 120 using any type of communications link. To this extent, valve control system 152 can manage a set of interfaces (e.g., graphical user interface(s), application program interface(s), etc.) that enable user(s) 162 to interact with valve control system 152. Further, valve control system 152 can manage (e.g., store, retrieve, create, manipulate, organize, present, etc.) data, such as system data 164 (including recorded temperatures, emission outputs, etc.) using any solution.

In any event, controller 120 can comprise one or more general-purpose or specific-purpose computing articles of manufacture (e.g., computing devices) capable of executing program code, such as valve control system 152, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the valve control system 152 can be embodied as any combination of system software and/or application software.

Further, the valve control system 152 can be implemented using a set of modules 168. In this case, a module 168 can enable the controller 120 to perform a set of tasks used by valve control system 152, and can be separately developed and/or implemented apart from other portions of valve control system 152. Controller 120 can also include a user interface module 170 for displaying (e.g., via graphics, text, and/or combinations thereof) a particular user interface on a display component such as a monitor. When fixed in memory 156 of controller 120 that includes processing component 154, a module is a substantial portion of a component that implements the functionality. Regardless, it is understood that two or more components, modules and/or systems may share some/all of their respective hardware and/or software. Further, it is understood that some of the functionality discussed herein may not be implemented or additional functionality may be included as part of controller 120.

When controller 120 comprises multiple computing devices, each computing device may have only a portion of valve control system 152 fixed thereon (e.g., one or more modules 168). However, it is understood that controller 120 and valve control system 152 are only representative of various possible equivalent computer systems that may perform a process described herein. To this extent, in other embodiments, the functionality provided by controller 120 and valve control system 152 can be at least partially implemented by one or more computing devices that include any combination of general and/or specific purpose hardware with or without program code. In each embodiment, the hardware and program code, if included, can be created using standard engineering and programming techniques, respectively.

Regardless, when controller 120 includes multiple computing devices, the computing devices can communicate over any type of communications link. Further, while performing a process described herein, controller 120 can communicate with one or more other computer systems using any type of communications link. In either case, the communications link can comprise any combination of various types of wired and/or wireless links; comprise any combination of one or more types of networks; and/or use any combination of various types of transmission techniques and protocols. In other embodiments, operating apparatus 100 and/or turbomachine 102 can include operating controller 120 manually (e.g., by a technician) or by the intervention of one or more computer systems operatively connected thereto. It is understood that controller 120 may serve technical purposes in other settings beyond providing evaporative cooling during general operation, including without limitation: inspection, maintenance, repair, replacement, testing, etc.

Valve control system 152 can be in the form of a computer program fixed in at least one computer-readable medium, which when executed, enables controller 120 to operate and adjust the position of valve(s) 118, 124. To this extent, the computer-readable medium includes program code which implements some or all of the processes and/or embodiments described herein. It is understood that the term "computer-readable medium" comprises one or more of any type of tangible medium of expression, now known or later developed, from which a copy of the program code can be perceived, reproduced or otherwise communicated by a computing device. For example, the computer-readable medium can comprise: one or more portable storage articles of manufacture; one or more memory/storage components of a computing device; paper; etc.

Figure 6:
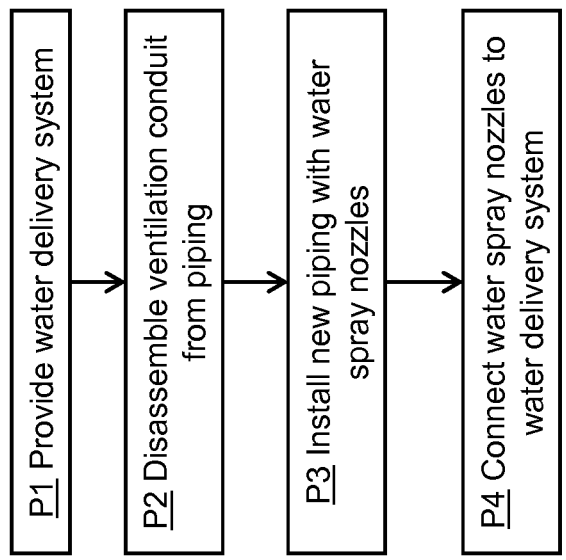
FIG. 6 provides a representative flow diagram of a method for installing a cooling system according to embodiments of the present disclosure.

Turning to FIG. 6, an illustrative method flow diagram is shown according to embodiments of the invention: In process P1, a water delivery system including, e.g., water supply 108, pump 110, water pipe 116, control valve 118, and/or valve(s) 124 can be supplied. The various components making up the water delivery system may form part of another system for use with turbomachine 102, including without limitation wet compression injector system 122 and/or water injector system 126. Following process P1, in process P2, ventilation conduit 104 can be removed from the piping of apparatus 100. Specifically, all or a portion of ventilation conduit 104 where nozzle(s) 106 can be installed may be removed. The removal in process P2 can be performed by technicians and/or machinery in response to a scheduled or a user prompted retrofitting process. In some processes, e.g., manufacture, a portion of ventilation conduit 104 can be manufactured separately in anticipation of nozzle(s) 106 and/or other components of apparatus 100 being installed therein.

In process P3, one or more nozzles 106 can be installed within one or more sections of ventilation conduit 104. In an embodiment, process P3 can represent the first step of installing apparatus 100 and/or modifying turbomachine 102, with processes P1 and/or P2 being optional and/or preparatory steps. Following process P3, in process P4, nozzle(s) 106 can be fluidly connected (i.e., placed in thermal communication with) water supply 108 to create a path of travel from water supply 108 to ventilation conduit 104. The processes shown in FIG. 6 can represent steps for manufacturing turbomachine 102 with original equipment therein for providing evaporative coolants to ventilation conduit 104. In other embodiments and/or contexts, one or more of processes P1-P4 can represent actions for retrofitting an existing turbomachine 102 and installing embodiments of apparatus 100.

The apparatus and method of the present disclosure is not limited to any one particular gas turbine, steam turbine, power generation system or other system, and may be used with other power generation systems and/or systems (e.g., combined cycle, simple cycle, nuclear reactor, etc.). Additionally, the apparatus of the present invention may be used with other systems not described herein that may benefit from the increased operational range, efficiency, durability and reliability of the apparatus described herein.

Technical effects of the present disclosure can include the ability to automatically and/or manually inject varying amounts of water as an evaporative coolant into a ventilation duct positioned between a compressor and a turbine component, thereby reducing the amount of cooling air drawn from the compressor as a bleed air. This functionality can augment power generation during routine operation and/or during particular events such as start-up, shutdown, and/or hibernation. Advantages of the present disclosure include an enhanced operational performance, including greater efficiency and power output, as a result of a power generation system having additional forms of cooling for several components therein. In addition, the total amount of cooling air drawn from one or more compressor components can be reduced.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
    a ventilation conduit for routing a cooling air from a compressor of a power generation system to a turbine component of the power generation system;
    a nozzle in fluid communication with the ventilation conduit, wherein the nozzle delivers water from a water supply into the ventilation conduit, and wherein the water supply and the compressor are fluidly connected to one of a wet compression injector system and a water injector system, the nozzle further including a plurality of apertures and a swirling chamber, the swirling chamber positioned upstream of the plurality of apertures such that fluid passes from the swirling chamber through the apertures, the plurality of apertures dimensioned to atomize the water;
    a control valve positioned between the water supply and the nozzle, wherein the control valve controls an amount of water delivered from the water supply to the nozzle;
    a second valve between the control valve and the nozzle;
    a third valve separating the control valve and the one of the wet compression injector system and the water injector system; and
    a controller operatively connected to the control valve, the second valve, and the third valve, wherein the controller adjusts a position of the control valve, the second valve, and the third valve.

2. The apparatus of claim 1, further comprising:
    a pump in fluid communication with the water supply,
    the control valve positioned between the pump and the nozzle.

3. The apparatus of claim 2, wherein the controller adjusts the position of the control valve, the second valve, and the third valve based on one of an operating condition of the power generation system and a cooling requirement for the power generation system.

4. The apparatus of claim 1, further comprising the wet compression injector system in fluid communication with the water supply and the compressor, wherein the nozzle delivers a portion of the water to the ventilation conduit from the wet compression injector system.

5. The apparatus of claim 1, further comprising the water injector system in fluid communication with the water supply and a fuel nozzle of the power generation system, wherein the nozzle in fluid communication with the ventilation conduit delivers a portion of the water to the ventilation conduit from the water injector system.

6. The apparatus of claim 1, wherein the plurality of apertures is further dimensioned to form water droplets having a diameter of between approximately five micrometers ($\mu$m) and approximately 40 $\mu$m.

7. The apparatus of claim 1, wherein the power generation system comprises a gas turbine system, and the turbine component includes a second stage wheel of the gas turbine system.

8. A turbomachine comprising:
    a compressor;
    a turbine component in fluid communication with the compressor through a combustor; and
    a ventilation conduit in fluid communication with the compressor and the turbine component, wherein the ventilation conduit routes a cooling air from the compressor to the turbine component, and further includes a nozzle for delivering water from a water supply into the cooling air,
    the nozzle further including a plurality of apertures and a swirling chamber, the swirling chamber positioned upstream of the plurality of apertures such that fluid passes from the swirling chamber through the apertures, the nozzle in fluid communication with the ventilation conduit, the plurality of apertures dimensioned to atomize the water.

9. The turbomachine of claim 8, further comprising:
    a pump in fluid communication with the water supply; and
    a control valve positioned between the pump and the nozzle, wherein the control valve controls an amount of the water delivered to the ventilation conduit.

10. The turbomachine of claim 9, further comprising a controller operatively connected to the control valve, wherein the controller adjusts a position of the control valve based on one of an operating condition of the turbomachine and a cooling requirement for the turbomachine.

11. The turbomachine of claim 8, further comprising a wet compression injector system in fluid communication with the water supply and the compressor, wherein the nozzle delivers a portion of the water to the ventilation conduit from the wet compression injector system.

12. The turbomachine of claim 11, further comprising:
    a valve positioned between the wet compression injector system and the nozzle; and a controller operatively connected to the valve, wherein the controller adjusts a position of the valve based on one of an operating condition of the turbomachine and a cooling requirement for the turbomachine.

13. The turbomachine of claim 8, further comprising a water injector system in fluid communication with the water supply and a fuel nozzle of the turbomachine, wherein the nozzle in fluid communication with the ventilation conduit delivers the water to the ventilation conduit from the water injector.

14. The turbomachine of claim 13, further comprising:
a valve positioned between the water injector system and the ventilation conduit; and
a controller operatively connected to the valve, wherein the controller adjusts a position of the valve based on one of an operating condition of the turbomachine and a cooling requirement for the turbomachine.

15. The turbomachine of claim 8, wherein the compressor and the turbine component are included within a gas turbine system, and the turbine component includes a second stage wheel of the gas turbine system.

16. An apparatus comprising:
a valve positioned between a water supply to a wet compression injector system and a nozzle in fluid communication with a ventilation conduit for routing a cooling air from a compressor of a power generation system to a turbine component of the power generation system;
and
a controller operatively connected to the valve, wherein the controller adjusts a position of the valve based on a difference between a temperature of a component in the power generation system and a cooling requirement of the power generation system,
the nozzle including a plurality of apertures and a swirling chamber, the swirling chamber positioned upstream of the plurality of apertures such that fluid passes from the swirling chamber through the apertures, the nozzle in fluid communication with the ventilation conduit, wherein the plurality of apertures is dimensioned to atomize the water.

17. The apparatus of claim 16, wherein the nozzle is in fluid communication with a pipe, the nozzle is between the pipe and the ventilation conduit, and the nozzle has a cross-sectional volume or geometry different from a cross sectional volume or geometry of the pipe.

* * * * *